US012698352B2

(12) United States Patent
Zhu et al.

(10) Patent No.: US 12,698,352 B2
(45) Date of Patent: Aug. 4, 2026

(54) HYDROPHOBIC POLYMER COMPOSITIONS AND A METHOD TO PREPARE HYDROPHOBIC POLYMER COMPOSITIONS

(71) Applicant: Mitsubishi Chemical America, Inc., Charlotte, NC (US)

(72) Inventors: Zhichen Zhu, Pearland, TX (US); Akihiro Kosoku, Houston, TX (US)

(73) Assignee: Mitsubishi Chemical America, Inc., Charlotte, NC (US)

(*) Notice: Subject to any disclaimer, the term of this patent is extended or adjusted under 35 U.S.C. 154(b) by 633 days.

(21) Appl. No.: 18/158,517

(22) Filed: Jan. 24, 2023

(65) Prior Publication Data

US 2024/0101731 A1 Mar. 28, 2024

Related U.S. Application Data

(60) Provisional application No. 63/302,694, filed on Jan. 25, 2022.

(51) Int. Cl.
*C08F 18/10* (2006.01)
*C08F 20/14* (2006.01)

(52) U.S. Cl.
CPC .............. *C08F 18/10* (2013.01); *C08F 20/14* (2013.01)

(58) Field of Classification Search
CPC .............. C08F 218/10; C08F 220/1811; C08F 220/1812; C08F 220/1804; C08F 220/1808
See application file for complete search history.

(56) References Cited

U.S. PATENT DOCUMENTS

| | | | | | |
|---|---|---|---|---|---|
| 5,519,093 | A * | 5/1996 | Pinschmidt, Jr. | C08F 8/12 | 525/368 |
| 5,972,329 | A * | 10/1999 | Chuang | A61K 31/78 | 426/330 |
| 6,331,587 | B1 * | 12/2001 | Geissler | C08F 218/04 | 525/61 |
| 2006/0235132 | A1 * | 10/2006 | Lyoo | A61P 31/06 | 524/556 |
| 2009/0264585 | A1 | 10/2009 | Avramidis et al. | | |
| 2011/0150818 | A1 * | 6/2011 | Canfield | C08L 51/085 | 424/78.02 |
| 2012/0061607 | A1 * | 3/2012 | McLennan | D04H 3/004 | 252/62 |
| 2017/0175335 | A1 * | 6/2017 | Daniels | D21H 19/58 | |

OTHER PUBLICATIONS

Extended European Search Report issued Sep. 15, 2025, in corresponding European Patent Application No. 23747533.0, 11 pages.

(Continued)

*Primary Examiner* — Mark S Kaucher
(74) *Attorney, Agent, or Firm* — Oblon, McClelland, Maier & Neustadt, L.L.P.

(57) ABSTRACT

Free-flowing beads of hydrophobic polymers having high chemical and optical purity are provided. The hydrophobic polymers are homopolymers or copolymers of monomers having a water solubility of less than 0.01 g/100 g $H_2O$. A method to prepare the hydrophobic polymer beads without use of surfactants or micelle forming agents is also provided.

25 Claims, 2 Drawing Sheets

(56) References Cited

OTHER PUBLICATIONS

Robson T. Araujo et al., "An experimental study on the synthesis of poly(vinyl pivalate)-based magnetic nanocomposites through suspension polymerization process", European Polymer Journal, vol. 68, May 18, 2015, pp. 441-459, XP029171069.
Brian W. Brooks, "Suspension Polymerization Processes", Chemical Engineering & Technology, vol. 33, No. 11, Oct. 25, 2010, pp. 1737-1744, XP071790892.

* cited by examiner

HYDROPHOBIC POLYMER COMPOSITIONS AND A METHOD TO PREPARE HYDROPHOBIC POLYMER COMPOSITIONS

CROSS REFERENCE TO RELATED APPLICATIONS

This applications claims priority to U.S. Provisional Application No. 63/302,694, filed Jan. 25, 2022, the disclosure of which is incorporated herein by reference in its entirety.

BACKGROUND OF THE INVENTION

The present disclosure is directed to high purity polymer compositions which are based on hydrophobic monomers which are water insoluble or have very low water solubility and methods to prepare the compositions in the form of free-flowing beads.

Hydrophobic polymers are conventionally employed as protective coatings in both exterior and interior coating applications where water penetration of the protective film is prevented or minimized and where alkali resistance is required. The availability of long chain branched esters such as vinyl neo-nonanoate, vinyl neo-decanoate, vinyl neo-undecanoate, vinyl neo-dodecanoate, and other hydrophobic monomers having very low water solubility have been conventionally employed as monomers or comonomers of polymer compositions to increase the hydrophobic nature of the polymer. Because these monomers are polymerizable with vinyl acetate and acrylic monomers, copolymers of these units have been prepared for applications including interior and exterior paints, clear and pigmented wood coatings, corrosion resistant metal coatings and coatings for cement and concrete structures. However, the difficulty to copolymerize or to homopolymerize, hydrophobic monomers of very low water solubility is described in U.S. Publication 2009/0264585. As related in this publication, methods to prepare polymers of such highly hydrophobic monomers are based on emulsion polymerization methods wherein the product obtained is an aqueous polymer emulsion containing surfactants and emulsifying agents. Although such emulsions are useful in latex coating applications, there are potential utilities where hydrophobic polymer compositions of high polymer purity and in solid form would have significant potential benefit.

One technical area of application is related to adhesives, coatings and inks which are applied to and bonded to plastic substrates, especially plastic substrates of polyolefins such as polyethylene and polypropylene which are known to be difficult to bond due to difficulty to wet the surface and difficulty to penetrate the plastic matrix. However, in order to be effective as adhesives, coatings or inks on such substrates, having the hydrophobic polymer as a relatively pure composition with low or very low water content and being free of surfactants and emulsifying agents would be advantageous. Having such compositions in the form of free-flowing solids such as beads would allow for facile handling on an industrial scale with good hygiene. Moreover, compositions which provide coatings and adhesive layers of high optical purity would be advantageous.

Thus, there is a need for hydrophobic polymer compositions of high purity in the form of easily handled solid powders or beads which provide coatings or layers of high optical purity.

Further, there is a need for a method to prepare hydrophobic polymer compositions which produces high purity hydrophobic polymers in high yield and in reaction times which are economically acceptable.

SUMMARY OF THE INVENTION

These and other objects are obtained within the present disclosure, the first embodiment of which provides a hydrophobic polymer composition, comprising:

a homopolymer of a hydrophobic monomer, a copolymer containing at least 30 mole % of the hydrophobic monomer or a mixture of the homopolymer and the copolymer; wherein the hydrophobic monomer is selected from the group consisting of vinyl neo-pentanoate, vinyl 2-ethylhexanoate, vinyl neo-nonanoate, vinyl neo-decanoate, vinyl neo-undecanoate, vinyl neo-dodecanoate and highly branched vinyl esters of formula (I):

$$H_2C{=}C(R){-}O{-}C(O){-}C(R_1)(R_2)(R_3) \quad (I)$$

wherein R is —H or —$CH_3$, and $R_1$, $R_2$ and $R_3$ are each independently C1 to C10 alkyl groups; and wherein the hydrophobic polymer composition is in the form of free-flowing beads containing the homopolymer and/or copolymer in at least 95% by weight.

In an aspect of the first embodiment, a molecular weight of the homopolymer and/or the copolymer is from 50,000 to 300,000 g/mole and a ratio Mw/Mn of the homopolymer and/or the copolymer is from 2.0 to 5.0.

In another aspect of the first embodiment, an optical clarity of a cast sheet of the hydrophobic polymer composition as measured by transmission of light of wavelength of 580 nm of a cast sheet of the resin having a thickness of 1.0 mm is 80% or higher according to ASTM D1003.

In another aspect of the first embodiment, a glass transition temperature ($T_g$) of the homopolymer and/or copolymer is from 0 to 100° C.

In another aspect of the first embodiment, a water solubility of the hydrophobic monomer is from completely insoluble to less than 0.01 g/100 g $H_2O$.

In another aspect of the first embodiment, a particle diameter of the free-flowing beads is from 50 to 500 microns.

In a further aspect of the first embodiment the copolymer containing at least 30 mole % of the hydrophobic monomer further comprises at least one comonomer selected from the group consisting of styrene, a derivative of styrene, ethylene, propylene, 1,3-butadiene, vinyl acetate, vinyl chloride, vinylidene chloride, acrylonitrile, (meth)acrylamide, an optionally substituted $C_1$-$C_{30}$alkyl ester of acrylic acid different from the highly branched vinyl esters of formula (I), and an optionally substituted $C_1$-$C_{30}$ alkyl ester of methacrylic acid different from the highly branched vinyl esters of formula (I).

In a second embodiment the present invention provides a method to prepare hydrophobic polymer compositions, comprising:

charging to a pressurizable reactor equipped with a dispersing agitation system an aqueous solution of an inorganic salt and a polymeric water-soluble material;

adding an organic peroxide and/or azo initiator to the aqueous solution;

adding a charge of the hydrophobic monomer or a charge of a mixture of monomers including at least 30 mole % of the hydrophobic monomer to the aqueous solution to obtain a two-phase monomer oil/aqueous mixture;

agitating the two-phase mixture at a speed to disperse the monomer and organic peroxide and/or azo initiator phase in the form of oil droplets having a size from 50 to 1000 microns in the aqueous phase to form a reaction mixture;

pressurizing the reactor with a gas chemically inert to the reaction mixture;

heating the reaction mixture at a polymerization temperature while maintaining the agitation at a dispersion speed to retain the monomer oil phase in the form of the droplets until polymerization completion and formation of solid beads;

heat treating the polymerization complete bead mixture at a temperature from 5 to 25° C. above the polymerization temperature for 1 to 10 hours;

cooling the heat treated polymerization complete bead mixture to 50° C. or less to obtain a slurry of homopolymer or copolymer beads and aqueous mother liquor;

removing the homopolymer or copolymer beads from the mother liquor; and drying the homopolymer or copolymer beads to obtain free flowing beads having a particle diameter from 50 to 500 microns; wherein a water solubility of the hydrophobic monomer ranges from completely insoluble to less than 0.01 g/100 g water.

In this second embodiment the hydrophobic monomers are the same as described in the first embodiment.

In a second aspect of the second embodiment the method further comprises adding at least one sulfur-containing compound selected from the group consisting of alkyl and substituted alkyl thioglycolates, alkyl and substituted alkyl mercaptans and alkyl and substituted alkyl mercaptopropionates to the charge of the hydrophobic monomer or mixture of monomers including the hydrophobic monomer.

In a third aspect of the second embodiment the method further comprises washing and centrifuging the copolymer beads removed from the mother liquor before drying the copolymer beads.

In another aspect of the second embodiment a monomer conversion to polymer or copolymer (monomer conversion rate) is at least 99%.

In another aspect of the second embodiment the polymeric water-soluble material is selected from the group consisting of hydroxyethyl cellulose, alkali metal salts of poly(meth) acrylic acid, an ammonium salt of poly(meth) acrylic acid, polyvinyl alcohol, and polyvinylpyrrolidone and a content of the polymeric water-soluble material in the aqueous solution is from 0.01 to 0.1 parts per 100 parts of water.

In another aspect of the second embodiment, the inorganic salt of the aqueous solution is an alkali metal sulfate, an alkali metal nitrate, an alkali metal phosphate, an alkali metal carbonate, an alkali metal bicarbonate or an alkali metal halide and a content of the inorganic salt in the aqueous solution is from 0.1 to 0.5 parts per 100 parts of water.

In another aspect of the second embodiment, the organic peroxide is selected from the group consisting of dibenzoyl peroxide, di-tert-butyl peroxide, dicumyl peroxide, dilauroyl peroxide, t-Hexyl peroxypivalate, t-Butyl peroxypivalate, di(3,5,5-trimethylhexanoyl) peroxide, di(4-methylbenzoyl) peroxide, di(3-methylbenzoyl) peroxide, benzoyl(3-methylbenzoyl) peroxide, t-hexyl peroxy-2-ethylhexanoate, 1,1,3,3-tetramethylbutyl peroxy-2-ethylhexanoate, t-butyl peroxy-2-ethylhexanoate, 2,5-Dimethyl-2,5-di(2-ethyhexanoylperoxy)hexane, tert-amyl peroxypivalate, tert-amyl peroxyisobutylate, tert-amyl peroxy-2-ethylhexanoate and t-butyl peroxybenzoate and a content of the organic peroxide is from 0.1 to 2.0 parts relative to 100 parts of total monomer.

In another aspect of the second embodiment, the polymerization temperature is from 50° C. to 95° C.

In another aspect of the second embodiment, a content of the charge of the hydrophobic monomer or the charge of the mixture of monomers including the hydrophobic monomer is from 25 to 100 parts per 100 parts of the water.

In a further aspect of the second embodiment, the mixture of monomers including a hydrophobic monomer is charged and the mixture further comprises at least one monomer selected from the group consisting of styrene, ethylene, propylene, 1,3-butadiene, vinyl acetate, vinyl chloride, vinylidene chloride, acrylonitrile, (meth)acrylamide, an optionally substituted $C_1$-$C_{30}$ alkyl ester of acrylic acid, and an optionally substituted $C_1$-$C_{30}$ alkyl ester of methacrylic acid.

In another aspect of the second embodiment, the reaction mixture does not comprise a surfactant or micelle forming agent.

In another aspect of the second embodiment, the mixture of monomers including a hydrophobic monomer is charged and the mixture does not comprise a cross-linking monomer.

The foregoing paragraphs have been provided by way of general introduction and are not intended to limit the scope of the following claims. The described embodiments, together with further advantages, will be best understood by reference to the following detailed description taken in conjunction with the accompanying drawings.

DESCRIPTION OF THE PREFERRED EMBODIMENTS

Figure 1:
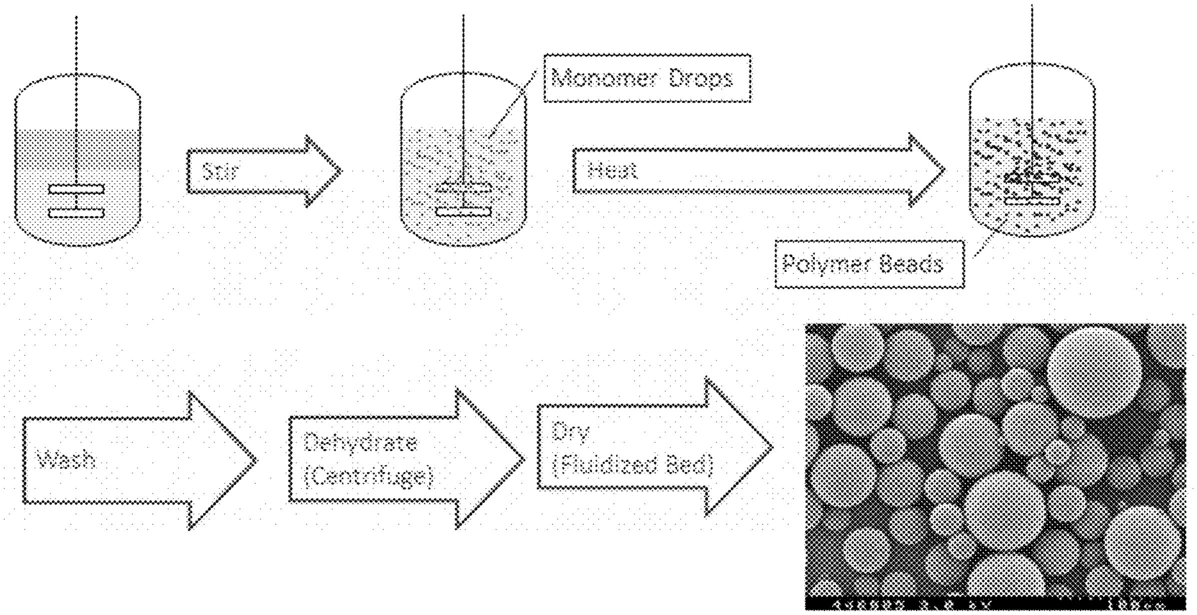
FIG. 1 shows a schematic flow chart of the method of polymerization of the present invention.

As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted.

Where a numerical limit or range is stated, the endpoints are included. Also, all values and subranges within a numerical limit or range are specifically included as if explicitly written out. When the term "about" is applied to a numerical value it conveys a value greater than and/or less than the value by 5%.

As used herein, the term "(meth)" as in (meth)acrylate, refers to the acrylate and/or the corresponding methacrylate, e.g. methyl (meth)acrylate refers to both methyl acrylate and methyl methacrylate. The term "copolymer" as used herein refers to a polymer polymerized from at least 2 monomers, and includes terpolymers, tetrapolymers, and the like.

As used herein, the term "polymerization conditions sufficient to polymerize the monomers of the monomer composition" means that the conditions are sufficient to achieve a monomer conversion to polymer or copolymer and a rate of monomer conversion may be expressed as a percent value, for example, at least 90 percent, at least 95 percent, at least 98 percent, or at least 99 percent as specified. The monomer conversion rate may be determined as described in the Examples of this disclosure.

The hydrophobic polymer composition of the present disclosure is based upon a homopolymer of a hydrophobic monomer or a copolymer containing at least 30 wt % of a hydrophobic monomer or mixture of hydrophobic monomers. According to the present disclosure a hydrophobic monomer is defined as a monomer which is completely insoluble in water or may have a solubility in water which is less than 0.01 g/100 g deionized $H_2O$ at 20° C.

Although any monomer having a water solubility from insoluble to less than 0.01 g/100 g $H_2O$ may be suitable as a hydrophobic monomer according to the present disclosure, preferred hydrophobic monomers are selected from the group consisting of vinyl neo-pentanoate, vinyl 2-ethylhexanoate, vinyl neo-nonanoate, vinyl neo-decanoate, vinyl neo-undecanoate, vinyl neo-dodecanoate and highly branched vinyl esters of formula (I):

$$H_2C{=}C(R){-}O{-}C(O){-}C(R_1)(R_2)(R_3) \quad (I)$$

wherein R is —H or —$CH_3$, and $R_1$, $R_2$ and $R_3$ are each independently C1 to C10 alkyl groups.

These monomers are conventionally known, and many are commercially available. For example, vinyl neo-pentanoate is available as Vinyl pivalate from Handan Huajun Chemicals Co., Ltd. Vinyl 2-ethylhexanoate is available from Chemoxy International Ltd. Vinyl neo-nonanoate, vinyl neo-decanoate and vinyl neo-undecanoate are available under the trade names, VeoVa 9, VeoVa 10 and VeoVa 11, respectively, from Hexion.

Although the homopolymers of the present disclosure are derived from one of the above identified hydrophobic monomers, the copolymers contain at least 30 wt % of one or more, preferably 40 wt % or more and most preferably 50 wt % or more of the hydrophobic monomers listed above and as long as not adversely affecting the hydrophobic properties, the copolymer may contain comonomers including one or more of vinyl laurate, vinyl stearate, vinyl alkyl or aryl ethers with ($C_9$-$C_{30}$) alkyl groups such as stearyl vinyl ether; ($C_6$-$C_{30}$) alkyl esters of (meth-)acrylic acid, such as hexyl (meth)acrylate, heptyl (meth)acrylate, octyl (meth)acrylate, isobornyl (meth)acrylate, isooctyl (meth)acrylate, isononyl (meth)acrylate, decyl (meth)acrylate, isodecyl (meth)acrylate, dodecyl (meth)acrylate, 2-ethylhexyl (meth)acrylate, benzyl (meth)acrylate, lauryl (meth)acrylate, oleyl (meth) acrylate, palmityl (meth)acrylate, and stearyl (meth)acrylate; and unsaturated vinyl esters of (meth)acrylic acid such as those derived from fatty acids and fatty alcohols.

Other comonomers included may be one or more selected from the group consisting of styrene, a derivative of styrene, ethylene, propylene, 1,3-butadiene, vinyl acetate, vinyl chloride, vinylidene chloride, acrylonitrile, (meth)acrylamide, an optionally substituted $C_1$-$C_{30}$ alkyl ester of acrylic acid, and an optionally substituted $C_1$-$C_{30}$ alkyl ester of methacrylic acid, wherein optional substituents may include halides, cyano, nitro, $C_{1-10}$ alkoxy groups, optionally substituted phenyl groups and optionally substituted benzyl or phenethyl groups. Derivatives of styrene include alkyl styrenes such as methyl or ethyl styrene as well as halogen substituted styrenes.

Mixtures of any of these monomers may be included in the hydrophobic copolymer of the invention. One of skill in the art may design the copolymer monomer composition based upon the performance properties selected for the target hydrophobic copolymer.

Any crosslinker suitable for radical polymerization may be applicable, but preferred examples include divinyl benzene, allyl methacrylate and 1,6-hexanediol dimethacrylate. The crosslinker is preferably used in 0 to 2.0 parts, more preferably in 0 to 0.5 parts per 100 parts monomer or comonomer. Although cross-linking agents may be included in the mixture of monomers to be polymerized, in the preferred embodiments no cross-linking monomers are present.

The homopolymer or copolymer according to the invention may have a molecular weight from 50,000 to 350,000 g/mole, preferably from 100,000 to 300,000 g/mole and most preferably from 125,000 to 275,000. Molecular weight may be determined by standard gel permeation chromatography (GPC) methods as described in the Examples. The molecular weight may be controlled by appropriate adaptation of the polymerization methods described later in this disclosure.

The polydispersity index (Mw/Mn) as determined by GPC of the homopolymers or copolymers of the present invention may be from 2.0 to 5.0, preferably 2.0 to 4.0 and most preferably from 2.0 to 3.0 and is determined by the monomer or monomers polymerized and polymerization method of the present invention.

Depending on the monomer composition of the hydrophobic homopolymer or hydrophobic copolymer the glass transition temperature (Tg) may be from 0 to 100° C. One of skill in the art can derive an appropriate hydrophobic polymer composition to have a target Tg value.

The hydrophobic polymer compositions according to the present disclosure are provided in solid powder or bead form containing the homopolymer, copolymer or mixture thereof in a content of at least 95 wt %, preferably at least 96 wt % and most preferably at least 97 wt % of the powder or bead. The physical form and high wt % are obtained as a result of the polymerization method employed to prepare the composition as described below. The method can produce the homopolymers or copolymers in yields (monomer conversion rate) of 97%, preferably 98% and most preferably 99% or higher without the use of surfactants or micelle forming agents.

Where the composition of the present disclosure contains a mixture of a hydrophobic homopolymer and a hydrophobic copolymer the mixture may be a physical blend of the homopolymer and the copolymer each produced individually. Any multiple of homopolymers and copolymers may be physically blended to obtain a composition having selected target properties.

Alternatively, a mixture may be prepared by first preparing a homopolymer in a reactor and then preparing the copolymer in the presence of the homopolymer in the same reactor.

The hydrophobic polymer compositions according to the present disclosure may be provided in the form of free-flowing beads having particle diameter of from 50 to 500 microns, preferably 100 to 400 microns and most preferably from 150 to 300 microns. According to the present invention the term "free-flowing" means that the resin composition beads are readily transferable from one container to another or from a container to a device hopper by gravity or conveyor without agglomeration or hang-up problems.

Due to the high wt % content and absence of contaminants such as surfactants and micelle forming agents the hydrophobic polymer compositions of the present disclosure provide coatings or cast layers having a high optical clarity. For example, a cast sheet of the polymer composition having a thickness of 1.0 mm may have an optical clarity as indicated by % transmission of light of 580 nm of 80% or higher, preferably, 85% or higher and most preferably, 90% or higher, according to ASTM D1003. Thus, the hydrophobic polymer compositions may be highly suitable as adhesives or coatings for polyethylene or polypropylene structures where optical clarity is necessary.

In a second embodiment the present disclosure provides a method to prepare hydrophobic polymer compositions having the compositions and properties described above. The method comprises:

- charging to a pressurizable reactor equipped with a dispersing agitation system an aqueous solution of an inorganic salt and a polymeric water-soluble material;
- adding an organic peroxide and/or azo initiator to the aqueous solution;
- adding a charge of the hydrophobic monomer or a charge of a mixture of monomers including at least 30 wt % of the hydrophobic monomer to the aqueous solution to obtain a two-phase monomer oil/aqueous mixture;
- agitating the two-phase mixture at a speed to disperse the monomer and organic peroxide and/or azo initiator phase in the form of oil droplets having a size from 50 to 1000 microns in the aqueous phase to form a reaction mixture;
- pressurizing the reactor with a gas chemically inert to the reaction mixture;
- heating the reaction mixture at a polymerization temperature while maintaining the agitation at a dispersion speed to retain the monomer oil phase in the form of the droplets until polymerization completion and formation of solid beads;
- heat treating the polymerization complete bead mixture at a temperature from 5 to 25° C. above the polymerization temperature for 1 to 10 hours;
- cooling the heat-treated polymerization complete bead mixture to 50° C. or less to obtain a slurry of homopolymer or copolymer beads and aqueous mother liquor;
- removing the homopolymer or copolymer beads from the mother liquor; and
- drying the homopolymer or copolymer beads to obtain free flowing beads having a particle diameter from 50 to 500 microns.

As previously defined the water solubility of the hydrophobic monomer ranges from completely insoluble to less than 0.01 g/100 g water.

The hydrophobic monomers and comonomers to be employed in the method are the same as previously described for the hydrophobic homopolymer or copolymer of the first embodiment.

The reactor employed in the disclosed process may be any conventional reactor having a dispersion agitator or mechanical system capable to disperse and maintain the hydrophobic monomer phase containing the organic peroxide and/or azo initiator at a droplet size of from 50 to 1000 microns, As the polymerization reaction is conducted under pressure the reactor must be rated for a working pressure of from about 20 psi (1.38 bar) to about 100 psi (6.9 bar) at temperatures ranging from 50° C. to 100° C. Reactors rated at pressures higher than this range may be employed.

As the method of the present disclosure is conducted in an aqueous medium the material of construction of the reactor may be any material conventionally employed for polymerization chemistry.

The gas employed to pressurize the reactor may be any gas which is chemically inert to the reaction mixture components and may be nitrogen, carbon dioxide or argon.

The water which constitutes the continuous aqueous phase may be filtered water and in a preferred embodiment the water is deionized and filtered. It may also be treated to remove biological contaminants.

The initial aqueous solution charged to the reactor contains from 0.1 to 0.5 parts of a water-soluble inorganic salt. Although any water-soluble inorganic salt based upon alkali metals, alkaline earth metals and transition metals that do not interfere with the polymerization reaction may be used, preferred inorganic salts are selected from the group consisting of alkali metal sulfates, alkali metal nitrates, alkali metal phosphates, alkali metal carbonates, alkali metal bicarbonates and alkali metal halides. Preferably the alkali metal is sodium or potassium.

The initial aqueous solution charged to the reactor also contains a polymeric water-soluble material which is preferably selected from the group consisting of hydroxyethyl cellulose, alkali metal salts of poly(meth)acrylic acid, an ammonium salt of poly(meth)acrylic acid, polyvinyl alcohol and polyvinylpyrrolidone. Mixtures of these materials may be employed.

The total content of the polymeric water-soluble material in the aqueous solution is from 0.01 to 0.1 parts per 100 parts of water.

The monomer composition is then charged, and the monomer charge may be from 25 to 100 parts per 100 parts of the aqueous solution in the reactor.

According to the method of the present invention organic peroxides and/or azo initiators are added to the aqueous mixture of the hydrophobic monomer and become dissolved within the dispersed monomer oil phase droplets. The organic peroxide may be any peroxide soluble in the monomer phase and in preferred embodiments the organic peroxide may be one or more peroxides selected from the group consisting of dibenzoyl peroxide, di-tert-butyl peroxide, dicumyl peroxide, dilauroyl peroxide, t-hexyl peroxypivalate, t-butyl peroxypivalate, di(3,5,5-trimethylhexanoyl) peroxide, di(4-methylbenzoyl) peroxide, di(3-methylbenzoyl) peroxide, benzoyl(3-methylbenzoyl) peroxide, t-hexyl peroxy-2-ethylhexanoate, 1,1,3,3-tetramethylbutyl peroxy-2-ethylhexanoate, t-butyl peroxy-2-ethylhexanoate, 2,5-dimethyl-2,5-di(2-ethyhexanoylperoxy)hexane, tert-amyl peroxypivalate, tert-amyl peroxyisobutylate, tert-amyl peroxy-2-ethylhexanoate and t-butyl peroxybenzoate.

The content of the organic peroxide may be in the range from 0.1 parts to 2.0 parts, preferably from 0.50 to 2.0 parts and most preferably from 1.0 to 2.0 parts relative to 100 parts of the monomer composition charged.

Nitrogen based radical azo initiators may be used alone or in conjunction with the peroxide initiators. Preferred examples include 2,2'-azobis-isobutyronitrile, 2,2'-azobis-2-methylbutyronitrile, 2,2'-azobis-2,4-dimethylvaleronitrile, 1,1'-azobis(1-acetoxy-1-phenylethane) and dimethyl 2,2'-azobisisobutyrate. The content of the nitrogen based radical initiator may be from 0 to 2.0 parts relative to 100 parts of total monomer, more preferably 0 to 0.5 parts, and most preferably no azo initiator is used.

The polymerization temperature is dependent upon the initiation temperature of the peroxide and/or azo initiator, i.e., the temperature at which the peroxide bond or azo bond cleaves and generates free radical initiation of the polymerization. Generally, the polymerization temperature may be from about 50° C. to about 95° C. although with selected monomer and organic peroxide or azo initiator combinations the temperature may be outside this range. One of skill in the art can determine the optimum polymerization temperature based on routine experimentation.

The inventors have discovered that the molecular weight and polydispersity of the obtained polymer may be controlled through the addition of sulfur-containing agents selected from the group consisting of alkyl and substituted alkyl thioglycolates, alkyl and substituted alkyl mercaptans and alkyl and substituted alkyl mercaptopropionates. Explicit examples of the sulfur-containing agents include, but are not limited to methyl thioglycolate, ethyl thioglycolate, butyl thioglycolate, octyl thioglycolate, 2-ethylhexyl thioglycolate, isooctyl thioglycolate, 3-methoxybutyl thioglycolate, ethylene bis (thioglycolate), polyethylene bis (thioglycolate), 1,4-butanediol bis (thioglycolate), 1,6-hexanediol bis (thioglycolate), pentaerythritol tetrakis (thioglycolate), stearyl thioglycolate, methyl mercaptan, ethyl mercaptan, butyl mercaptan, cyclohexyl mercaptan, 2-ethylhexyl mercaptan, n-octyl mercaptan, t-nonyl mercaptan, n-dodecyl mercaptan, t-dodecyl mercaptan, t-tetradecyl mercaptan, t-hexadecyl mercaptan, adamantyl mercaptan, 1-p-menthen-8-thiol, p-mentha-8-thiol-3-one, stearyl mercaptan, benzyl mercaptan, methyl 3-mercaptopropionate, ethyl 3-mercaptopropionate, butyl 3-mercaptopropionate, octyl 3-mercaptopropionate, 2-ethylhexyl 3-mercaptopropionate, isooctyl 3-mercaptopropionate, 3-methoxybutyl 3-mercaptopropionate, tridecyl 3-mercaptopropionate, ethylene glycol bis (3-mercaptopropionate), polyethylene glycol bis (3-mercaptopropionate), 1,4-butanediol bis (3-mercaptopropionate), 1,6-hexanediol bis (3-mercaptopropionate), trimethylol propane tris (3-mercaptopropionate), pentaerythritol tetrakis (3-mercaptopropionate), stearyl 3-mercaptopropionate.

In a preferred embodiment, the sulfur-containing agents may be selected from the group consisting of methyl thioglycolate, ethyl thioglycolate, butyl thioglycolate, octyl thioglycolate, 2-ethylhexyl thioglycolate, isooctyl thioglycolate, 3-methoxybutyl thioglycolate, ethylene bis (thioglycolate), polyethylene bis (thioglycolate), 1,4-butanediol bis (thioglycolate), 1,6-hexanediol bis (thioglycolate), pentaerythritol tetrakis (thioglycolate), stearyl thioglycolate, methyl 3-mercaptopropionate, ethyl 3-mercaptopropionate, butyl 3-mercaptopropionate, octyl 3-mercaptopropionate, 2-ethylhexyl 3-mercaptopropionate, isooctyl 3-mercaptopropionate, 3-methoxybutyl 3-mercaptopropionate, tridecyl 3-mercaptopropionate, ethylene glycol bis (3-mercaptopropionate), polyethylene glycol bis (3-mercaptopropionate), 1,4-butanediol bis (3-mercaptopropionate), 1,6-hexanediol bis (3-mercaptopropionate), trimethylol propane tris (3-mercaptopropionate), pentaerythritol tetrakis (3-mercaptopropionate), stearyl 3-mercaptopropionate.

Mixtures of these sulfur-containing compounds may be employed.

Preferably, no surfactants and no micelle forming agents are added to the reactor and the presence of such materials in the polymerization reactor is to be avoided.

According to the method of the disclosure, once all components that constitute the polymerization reaction medium are charged to the reactor, the system may be purged with the inert gas and then pressurized. The agitation system which may have been operating at one speed to mix the components during the charge is then increased to an agitation level sufficient to form the hydrophobic oil phase droplets containing the organic peroxide and/or azo initiator and sulfur-containing compound. The temperature is increased to a polymerization temperature and maintained at that temperature until polymerization within the oil phase droplets is complete and the oil droplets are converted to solid beads. The polymerization may take from 0.5 to 10 hours depending on the monomer(s) employed, the content of the peroxide and/or azo initiator and the polymerization temperature.

Once the solid beads have been formed and the polymerization is substantially complete, the aqueous mixture of the beads is heat treated by raising the temperature to a treatment temperature which is 5 to 25° C. higher than the polymerization temperature and maintained at that temperature for from 1 to 10 hours.

At the end of the heat treatment the beads have cured to solid particles having a particle diameter from 50 to 500 microns. The beads are separated from the reaction mother liquors by any method commonly employed in the art. For example, the bead slurry may be decanted, washed, and then transferred to a centrifuge and collected. Alternatively, the beads may be filtered.

The collected beads may be reslurried in water and collected by centrifuge or filtration one or more times to remove remnants of the mother liquors before drying.

The beads are then dried in a conventional manner such as hot air-drying ovens or fluid bed driers at a temperature of from room temperature to a temperature 20° C. below the Tg of the hydrophobic polymer.

FIG. 1 shows a schematic diagram of the steps of the method as described above including an image of the obtained beads.

As shown in Tables 1 and 2, the method of the present disclosure has wide applicability to the preparation of homopolymers and copolymers of hydrophobic monomers as disclosed herein. The present method can be designed to provide hydrophobic polymers having a wide range of physical properties in the form of free-flowing beads of high polymer wt % and high light transmission.

The above description is presented to enable a person skilled in the art to make and use the embodiments and aspects of the disclosure and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. In this regard, certain embodiments within the disclosure may not show every benefit of the disclosure, considered broadly.

EXAMPLES

Molecular Weight Determination

Molecular weights were obtained by standard gel permeation chromatography (GPC). GPC measurements were taken on a Tosoh HLC-8320GPC with three columns in series; two TSKgel SuperHZM-M followed by HZ2000. Measurement was done by RI at 0.2% polymer concentration in THF at 0.35 mL/min flow rate and 40 degrees Celsius.

Example 1

Polymerization Stage:

A reactor was charged with 200 parts of water, 0.5 parts of sodium sulfate, 0.03 parts of poly(methacrylic acid) potassium salt as suspension stabilizer. Then, to the reactor was added 1 part of benzoyl peroxide as initiator (BPO), and a monomer mixture comprising of 75 parts of vinyl neodecanoate (VV-10), 20 parts of isobornyl methacrylate (IBOMA) and 5 parts of lauryl methacrylate (LMA). After the completion of the addition, the water and monomer mixture was agitated mechanically at 1000 rpm to disperse mixture of monomers in water, forming monomer droplets with diameters from 100 to 500 microns.

After the inside of the reactor was replaced by nitrogen with a pressure at 45 psi, the mixture of the reactor was heated to 85° C. reaction temperature and polymerization with stirring was continued 45 minutes. The competition of the polymerization was judged from the peak of temperature accompanied by a pressure drop.

Heat Treatment Stage:

After the completion of polymerization, the contents of the reactor were held at 95° C. for 60 minutes. At the end of heat treatment stage, the reaction mixture was cooled to 40° C. and the contents of the reactor were discharged under pressure to a slurry tank. The polymerization yield (monomer conversion rate) was determined to be 99.5%.

polymerization yield (monomer conversion rate) was 97.0%, and the weight average molecular weight of the resulting sample is 150,000 as measured by GPC.

Example 3

The sample was obtained in the same manner as in Example 1 except that 0.6 parts of 2-Ethylhexyl thioglycolate (2-EHTG) was added as chain transfer agent along with the mixture of monomers. The polymerization yield (monomer conversion rate) was 99.3%, and the weight average molecular weight of the resulting sample was 85,000 as measured by GPC.

Comparative Example 2

The sample was obtained in the same manner as in Example 3 except that 0.6 parts of 2-Ethylhexyl thioglycolate (2-EHTG) was replaced by 0.6 parts of n-octyl mercaptan (NOM). The polymerization yield (monomer conversion rate) was 96.2%, and the weight average molecular weight of the resulting sample is 110,000 as measured by GPC.

Table 1 provides a summary of these examples.

TABLE 1

| | Monomer compositions (parts by weight) | | | Chain transfer agent (parts) | | | | | Polymerization conditions | | Heat treatment conditions | | | Weight average |
|---|---|---|---|---|---|---|---|---|---|---|---|---|---|---|
| | VV- | | | 2- | | Initiator (parts) | | | Temperature, | Duration, | Temperature, | Duration, | | molecular |
| Expt. | 10 | IBOMA | LMA | EHTG | NOM | BPO | LPO | AIBN | ° C. | minutes | ° C. | minutes | Yield | weight |
| I | 75 | 20 | 5 | | | 1 | | | 85 | 45 | 95 | 60 | 99.5% | 190,000 |
| II | 75 | 20 | 5 | | | | 1 | | 85 | 45 | 95 | 60 | 99.4% | 260,000 |
| III | 75 | 20 | 5 | | | | | 1 | 85 | 45 | 95 | 60 | 97.0% | 150,000 |
| IV | 75 | 20 | 5 | 0.6 | | 1 | | | 85 | 45 | 95 | 60 | 99.3% | 85,000 |
| V | 75 | 20 | 5 | | 0.6 | 1 | | | 85 | 45 | 95 | 60 | 96.2% | 110,000 |

Dewatering and Drying:

The wet product was transferred, centrifuged, washed with water, and dried for 2 hours at 40° C. The finished product was dried beads with diameter of 100 to 300 microns.

Typical physical properties of the finished products are listed as below:

| Appearance | Free flowing solid bead |
|---|---|
| Particle Size | 100-300 μm |
| Glass Transition Temp, onset (measured) | 45° C. |
| Molecular Weight (Mw) | 190,000 |
| Moisture, % | <0.5 |

Example 2

The sample was obtained in the same manner as in Example 1 except that 1 part of benzoyl peroxide was replaced by 1 part of lauryl peroxide (LPO). The polymerization yield (monomer conversion rate) was 99.4%, and the weight average molecular weight of the resulting sample is 260,000 as measured by GPC.

Comparative Example 1

The sample was obtained in the same manner as in Example 1 except that 1 part of benzoyl peroxide was replaced by 0.4 part of azobisisobutyronitrile (AIBN). The In the same manner as described above the hydrophobic polymers described in the following Table 2 were prepared and analyzed. The light transmission data was obtained by dissolving the hydrophobic resin composition in toluene at 40 to 50% solids content. A film of the solution was prepared using a drawdown bar appropriately sized to provide a 1 mm dry film upon evaporation of the toluene. The dry film was cut to appropriate size and light transmission to light of 580 nm according to ASTM D1003 was measured.

Figure 2:
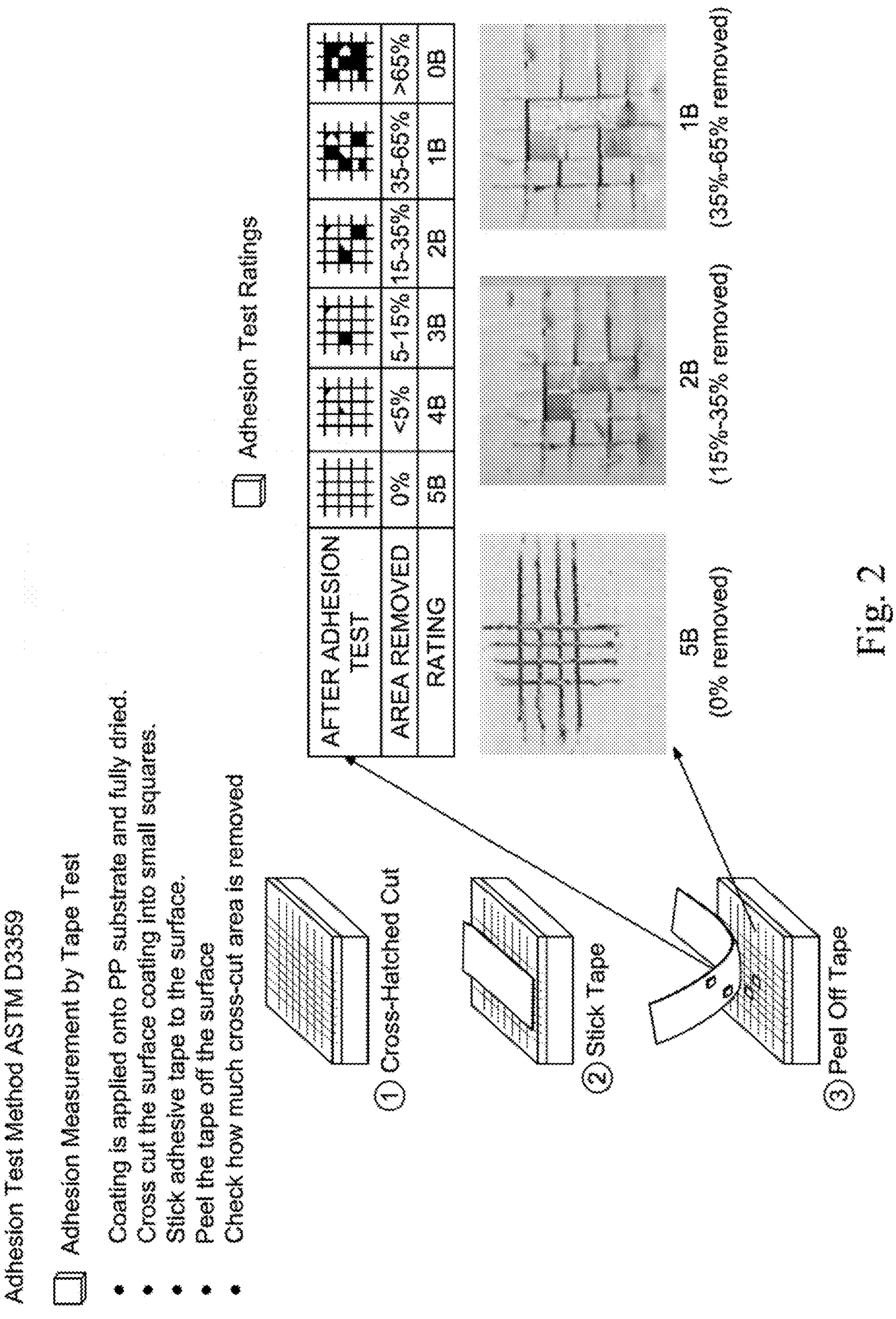
FIG. 2 describes the adhesion test method employed to evaluate examples of the invention.

The samples were also evaluated for adhesiveness to polypropylene according to ASTM D3359 as indicated in FIG. 2. The samples were prepared as 40% resin in toluene solutions with or without plasticizer. A drawdown of the solution on a polypropylene substrate was prepared and dried. The tape test according to ASTM D3359 was then performed to obtain the results shown in Table 2.

Monomer conversion rate is defined as a percentage conversion of monomer to polymer.

%=weight of polymer/(weight of monomer+weight of polymer).

Monomer conversion rate is determined by gas chromatography.

Polymer dispersity is defined as the ratio Mw/Mn and is determined by GPC analysis.

The plasticizer employed was Hexamoll® DINCH, which is 1,2-cyclohexane dicarboxylic acid diisononyl ester. As this was tested to reflect possible actual utility any general plasticizer, known to one of skill in the art of adhesives may be employed.

TABLE 2

| Composition of monomer mixture before polymerization, parts by weight | | | | | | | | | | | | | | | |
|---|---|---|---|---|---|---|---|---|---|---|---|---|---|---|---|
| | | | | | | | | | | | | | Adhesion to Polypropylene (the adhesion of film coatings to substrates is assessed by applying and removing pressure-sensitive tape over cuts made in the film per ASTM D3359) | | |
| | | | | | | | | | Physical Properties | | | Monomer | With no | with the use of 10% | Light |
| No. | VV-9 | VV-10 | MMA | t-BMA | BA | 2-EHA | LMA | IBOMA | Mw | Polymer dispersity | Tg/° C. Cal. | Conversion Rate % | use of plasticizer | plasticizer Hexamoll ® DINCH | Transmission, % |
| #1 | 100 | | | | | | | | 223,000 | 4.3 | 70 | 99.5 | 5 | 5 | 92.1 |
| #2 | 70 | | | 30 | | | | | 126,000 | 1.7 | 85 | 99.1 | 3 | 5 | 90.1 |
| #3 | 85 | | | | 15 | | | | 273,000 | 4.6 | 40 | 99.4 | 4 | 5 | 85.9 |
| #4 | 85 | | | | | 15 | | | 231,000 | 3.8 | 40 | 99.2 | 3 | 5 | 89.9 |
| #5 | 70 | | | | | 30 | | | 338,000 | 4 | 15 | 99.1 | 5 | 5 | 88.7 |
| #6 | 90 | | | | | | 10 | | 115,000 | 2.5 | 50 | 99.4 | 3 | 5 | 90.7 |
| #7 | 85 | | | | | | 15 | | 141,000 | 2.9 | 40 | 99.2 | 3 | 5 | 88.9 |
| #8 | 80 | | | | | | 20 | | 163,000 | 3.7 | 30 | 99.1 | 4 | 5 | 85.9 |
| #9 | 75 | | | | | | 25 | | 184,000 | 3.2 | 20 | 99.1 | 4 | 5 | 87.1 |
| #10 | 70 | | | | | | 30 | | 223,000 | 4.3 | 15 | 99.0 | 5 | 5 | 86.1 |
| #11 | 60 | 40 | | | | | | | 120,000 | 2.6 | 45 | 99.1 | 5 | 5 | 91 |
| #12 | | 100 | | | | | | | 173,000 | 2.8 | 0 | 99.4 | 4 | 5 | 90.2 |
| #13 | | 80 | | | | | | 20 | 160,000 | 3.0 | 40 | 99.3 | 5 | 5 | 86 |
| #14 | | 70 | | | | | | 30 | 139,000 | 2.7 | 57 | 99.5 | 3 | 5 | 85.2 |
| #15 | | 70 | | | | | 5 | 25 | 190,000 | 2.9 | 45 | 99.5 | 5 | 5 | 85 |
| #16 | | 70 | | | | | 30 | | 154,000 | 2.8 | −20 | 99.1 | 5 | 5 | 89.3 |
| #17 | | 60 | | | | | 20 | 20 | 63,000 | 2.5 | 5 | 99.1 | 3 | 5 | 88.6 |
| #18 | | 40 | | | | 20 | | 40 | 75,000 | 2.7 | 30 | 99.2 | 0 | 2 | 84 |
| #19 | | 40 | | | | | 20 | 40 | 73,000 | 2.6 | 30 | 99.1 | 0 | 3 | 87.9 |
| #20 | | 50 | 50 | | | | | | 125,000 | 1.9 | 44 | 96.9 | 0 | 0 | 74.2 |
| #21 | | 40 | 40 | | | 20 | | | 86,000 | 3.2 | 35 | 97.9 | 0 | 0 | 79.8 |
| #22 | | 50 | 25 | | | 25 | | | 325,000 | 4.5 | 5 | 98.3 | 0 | 0 | 81.8 |
| #23 | | 40 | 45 | | 15 | | | | 115,000 | 2.3 | 47 | 98.2 | 0 | 0 | 76 |

The abbreviations of the Tables are defined as follows:

VV-9: vinyl neononanoate

VV-10: vinyl neodecanoate

IBOMA: isobornyl methacrylate

LMA: lauryl methacrylate

2-EHA: 2-ethylhexylacrylate

MMA: methyl methacrylate

BA: butyl acrylate t-BMA: tert-butyl methacrylate

2-EHTG: ethylhexyl thioglycolate

NOM: n-octyl mercaptan

AIBN: azobisisobutyronitrile

LPO: lauryl peroxide

BPO: benzoyl peroxide

As indicated in Table 2 all homopolymers and copolymers according to the present disclosure exhibit a % light transmission of greater than 80/a according to ASTM D1003 at 580 nm and a polymer wt % of 99.0% or greater. It is noted that Examples 20 to 23 are not hydrophobic copolymers according to the present disclosure due to low light transmission and/or low monomer conversion rate.

Adhesion performance according to ASTM D3359 is a function of hydrophobic monomer content, the comonomer used and comonomer content as well as the molecular weight of the polymer. When high content of hydrophobic monomer is present such as shown in Examples 1 and 11, adhesion to polypropylene is at the highest rating regardless of the molecular weight of the polymer. When less hydrophobic comonomers are included, adhesion performance to polypropylene is improved with the addition of a plasticizer.

The invention claimed is:

1. A hydrophobic polymer composition, comprising:

a homopolymer of a hydrophobic monomer, a copolymer containing at least 30 wt % of at least one hydrophobic monomer or a mixture of the homopolymer and the copolymer;

wherein the hydrophobic monomer is selected from the group consisting of vinyl neo-pentanoate, vinyl 2-ethylhexanoate, vinyl neo-nonanoate, vinyl neo-decanoate, vinyl neo-undecanoate, vinyl neo-dodecanoate and highly branched vinyl esters of formula (I):

$$H_2C{=}C(R){-}O{-}C(O){-}C(R_1)(R_2)(R_3) \quad (I)$$

wherein

R is —H or —$CH_3$, and $R_1$, $R_2$ and $R_3$ are each independently C1 to C10 alkyl groups;

the copolymer containing at least 30 wt % of at least one hydrophobic monomer consists of the at least one hydrophobic monomer and at least one comonomer selected from the group consisting of styrene, a derivative of styrene, ethylene, propylene, 1,3-butadiene, vinyl chloride, vinylidene chloride, acrylonitrile, (meth)acrylamide, an optionally substituted $C_1$-$C_{30}$ alkyl ester of acrylic acid, and an optionally substituted $C_1$-$C_{30}$ alkyl ester of methacrylic acid, wherein a weight average molecular weight of the homopolymer and/or the copolymer is from 50,000 to 300,000 g/mole, a ratio Mw/Mn of the homopolymer and/or the copolymer is from 2.0 to 5.0, and the hydrophobic polymer composition is in the form of free-flowing beads containing the homopolymer and/or copolymer in a content of at least 95 wt %.

2. The hydrophobic polymer composition of claim 1, wherein an optical clarity as measured by transmission of light of wavelength of 580 nm of a cast sheet of the resin having a thickness of 1.0 mm is 80% or higher according to ASTM D1003.

3. The hydrophobic polymer composition of claim 1, wherein a glass transition temperature ($T_g$) of the homopolymer and/or copolymer is from 0 to 100° C.

4. The hydrophobic polymer composition of claim 1, wherein a water solubility of the hydrophobic monomer is from completely insoluble to less than 0.01 g/100 g $H_2O$.

5. The hydrophobic polymer composition of claim 1, wherein a particle diameter of the free-flowing beads is from 50 to 500 microns.

6. The hydrophobic polymer composition of claim 1, which comprises the homopolymer of a hydrophobic monomer.

7. The hydrophobic polymer composition of claim 1, which comprises the copolymer, wherein the copolymer contains a mixture of the hydrophobic monomers.

8. A method to prepare the hydrophobic polymer composition of claim 1, comprising:

charging to a pressurizable reactor equipped with a dispersing agitation system an aqueous solution of an inorganic salt and a polymeric water-soluble material;

adding an organic peroxide and/or azo initiator to the aqueous solution;

adding a charge of the hydrophobic monomer or a charge of a mixture of monomers including at least 30 wt % of the hydrophobic monomer to the aqueous solution to obtain a two phase monomer oil/aqueous mixture;

agitating the two phase mixture at a speed to disperse the monomer and organic peroxide phase in the form of oil droplets having a size from 50 to 1000 microns in the aqueous phase to form a reaction mixture;

pressurizing the reactor with a gas chemically inert to the reaction mixture;

heating the reaction mixture at a polymerization temperature while maintaining the agitation at a dispersion speed to retain the monomer oil phase in the form of the droplets until polymerization completion and formation of solid beads;

heat treating the polymerization complete bead mixture at a temperature from 5 to 25° C. above the polymerization temperature for 1 to 10 hours;

cooling the heat-treated polymerization complete bead mixture to 50° C. or less to obtain a slurry of homopolymer or copolymer beads and aqueous mother liquor;

removing the homopolymer or copolymer beads from the mother liquor; and drying the homopolymer or copolymer beads to obtain free flowing beads having a particle diameter from 50 to 500 microns;

wherein a water solubility of the hydrophobic monomer ranges from completely insoluble to less than 0.01 g/100 g water.

9. The method of claim 8, further comprising adding at least one sulfur-containing compound selected from the group consisting of alkyl and substituted alkyl thioglycolates, alkyl and substituted alkyl mercaptans and alkyl and substituted alkyl mercaptopropionates to the charge of the hydrophobic monomer or mixture of monomers including the hydrophobic monomer.

10. The method of claim 9, wherein the at least one sulfur-containing compound is selected from the group consisting of methyl thioglycolate, ethyl thioglycolate, butyl thioglycolate, octyl thioglycolate, 2-ethylhexyl thioglycolate, isooctyl thioglycolate, 3-methoxybutyl thioglycolate, ethylene bis (thioglycolate), polyethylene bis (thioglycolate), 1,4-butanediol bis (thioglycolate), 1,6-hexanediol bis (thioglycolate), pentaerythritol tetrakis (thioglycolate), stearyl thioglycolate, methyl 3-mercaptopropionate, ethyl 3-mercaptopropionate, butyl 3-mercaptopropionate, octyl 3-mercaptopropionate, 2-ethylhexyl 3-mercaptopropionate, isooctyl 3-mercaptopropionate, 3-methoxybutyl 3-mercaptopropionate, tridecyl 3-mercaptopropionate, ethylene glycol bis (3-mercaptopropionate), polyethylene glycol bis (3-mercaptopropionate), 1,4-butanediol bis (3-mercaptopropionate), 1,6-hexanediol bis (3-mercaptopropionate), trimethylol propane tris (3-mercaptopropionate), pentaerythritol tetrakis (3-mercaptopropionate), stearyl 3-mercaptopropionate.

11. The method of claim 8, wherein a monomer conversion rate to polymer or copolymer is at least 99%.

12. The method of claim 8, further comprising washing and centrifuging the copolymer beads removed from the mother liquor before drying the copolymer beads.

13. The method of claim 8, wherein the polymeric water-soluble material is at least one selected from the group consisting of hydroxyethyl cellulose, alkali metal salts of poly(meth)acrylic acid, an ammonium salt of poly(meth) acrylic acid, polyvinyl alcohol and polyvinylpyrrolidone.

14. The method of claim 8, wherein a content of the polymeric water soluble material in the aqueous solution is from 0.01 to 0.1 parts per 100 parts of water.

15. The method of claim 8, wherein the inorganic salt of the aqueous solution is an inorganic salt of an alkali metal, an alkaline earth metal or a transition metal.

16. The method of claim 8, wherein the inorganic salt of the aqueous solution is an alkali metal sulfate, an alkali metal nitrate, an alkali metal phosphate, an alkali metal carbonate, an alkali metal bicarbonate or an alkali metal halide.

17. The method of claim 8 wherein a content of the inorganic salt in the aqueous solution is from 0.1 to 0.5 parts per 100 parts of water.

18. The method of claim 8, wherein the organic peroxide is employed and is selected from the group consisting of dibenzoyl peroxide, di-tert-butyl peroxide, dicumyl peroxide, dilauroyl peroxide, t-hexyl peroxypivalate, t-butyl peroxypivalate, di(3,5,5-trimethylhexanoyl) peroxide, di(4-methylbenzoyl) peroxide, di(3-methylbenzoyl) peroxide, benzoyl(3-methylbenzoyl) peroxide, t-hexyl peroxy-2-ethylhexanoate, 1,1,3,3-tetramethylbutyl peroxy-2-ethylhexanoate, t-butyl peroxy-2-ethylhexanoate, 2,5-dimethyl-2,5-di(2-ethyhexanoylperoxy) hexane, tert-amyl peroxypivalate, tert-amyl peroxyisobutylate, tert-amyl peroxy-2-ethylhexanoate and t-butyl peroxybenzoate.

19. The method of claim 8 wherein a content of the organic peroxide is from 0.1 to 2.0 parts relative to 100 parts of total monomer.

20. The method of claim 8 wherein the azo initiator is employed and is selected from the group consisting of 2,2'-azobis-isobutyronitrile, 2,2'-azobis-2-methylbutyronitrile, 2,2'-azobis-2,4-dimethylvaleronitrile, 1,1'-azobis(1-acetoxy-1-phenylethane) and dimethyl 2,2'-azobisisobutyrate.

21. The method of claim 8 wherein a content of the charge of the hydrophobic monomer or the charge of the mixture of monomers including the hydrophobic monomer is from 25 to 100 parts per 100 parts of the water.

22. The method of claim 8 wherein the mixture of monomers including a hydrophobic monomer is charged and the mixture further comprises at least one monomer selected from the group consisting of a styrene, a derivative of styrene, ethylene, propylene, 1,3-butadiene, vinyl chloride, vinylidene chloride, acrylonitrile, (meth)acrylamide, an optionally substituted $C_1$-$C_{30}$ alkyl ester of acrylic acid, and an optionally substituted $C_1$-$C_{30}$ alkyl ester of methacrylic acid.

23. The method of claim 8 wherein the reaction mixture does not comprise a surfactant or micelle forming agent.

24. The method of claim 8 wherein the mixture of monomers including a hydrophobic monomer is charged and the mixture does not comprise a cross-linking monomer.

25. The method of claim 8 wherein the polymerization temperature is from 50° C. to 95° C.

* * * * *